May 20, 1924.  
E. B. LEWIS ET AL  
INSECT CATCHER  
Filed Feb. 4, 1922   2 Sheets-Sheet 2
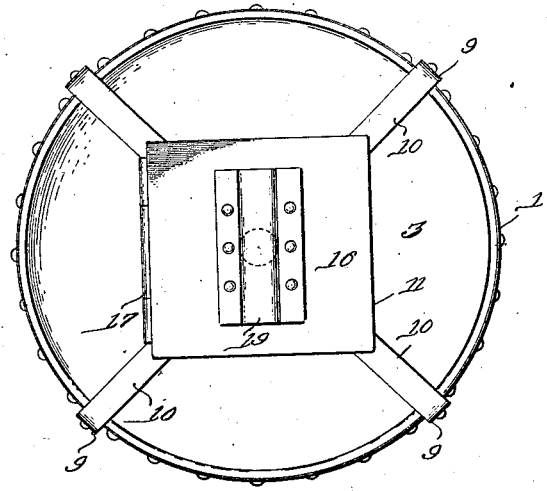
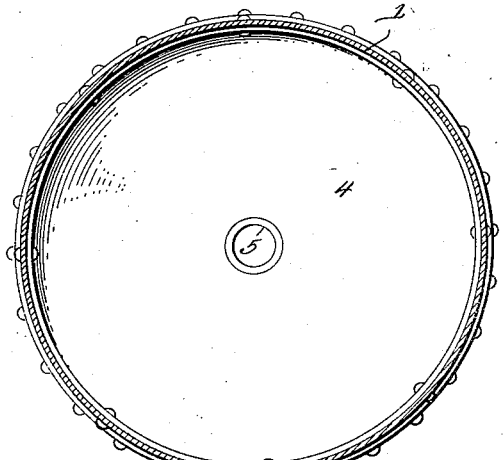
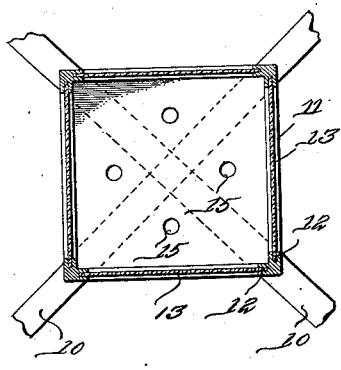

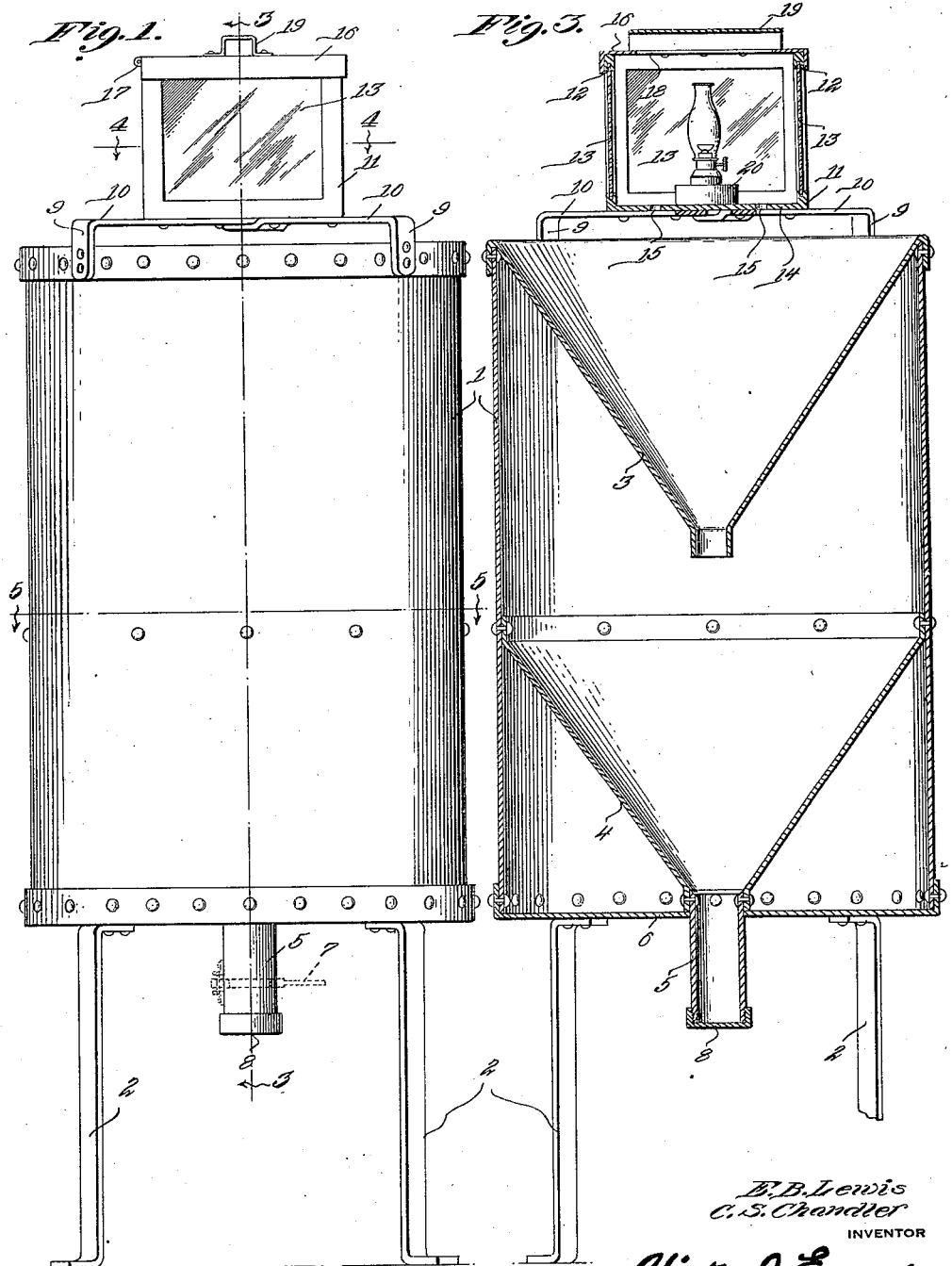

Patented May 20, 1924.

1,495,089

UNITED STATES PATENT OFFICE.

EDGAR B. LEWIS AND CLARENCE S. CHANDLER, OF GREENVILLE, SOUTH CAROLINA.

INSECT CATCHER.

Application filed February 4, 1922. Serial No. 534,185.

*To all whom it may concern:*

Be it known that we, EDGAR B. LEWIS and CLARENCE S. CHANDLER, citizens of the United States, residing at Greenville, in the county of Greenville and State of South Carolina, have invented new and useful Improvements in Insect Catchers, of which the following is a specification.

The present invention has reference to a device for trapping insects, and particularly boll weevils which fly at night.

An object is to produce a simply constructed device in the nature of a leg supported casing that has an inwardly directed funnel at the top thereof and an outwardly directed funnel at the bottom thereof, a valve or cap controlling the opening in the latter, while supported centrally and above the casing there is an insect attracting medium which is preferably in the nature of a transparent housing for a light, the light in the housing attracting the insects who contact therewith and fall into the casing through the outer funnel. The casing may have arranged therein an insect destroying agent and the trapped insects are let out of the casing through the lower funnel when the valve or door therefor is open.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of the improvement.

Figure 2 is a top plan view thereof.

Figure 3 is a sectional view on the line 3—3 of Figure 1.

Figure 4 is a sectional view on the line 4—4 of Figure 1.

Figure 5 is a sectional view on the line 5—5 of Figure 1.

Referring now to the drawings in detail, the numeral 1 designates a casing which is preferably but not necessarily cylindrical in cross section. The casing is supported upon depending legs 2.

The casing has its top provided with an inwardly directed funnel-shaped member 3 and its bottom likewise provided with an outwardly directed funnel-shaped member 4. The inwardly flared funnel-shaped member 3 is not provided with an outlet spout, but the funnel 4 has such a spout, the same being designated by the numeral 5 in the drawings. Preferably the lower funnel 4 is wholly enclosed in the casing, the said casing being provided with a bottom 6 through which the spout 5 extends and to which the spout is secured. This materially braces the spout. The spout may have its passage controlled by a valve 7, as indicated in the dotted lines in Figure 1 of the drawings, or the spout may be closed by a flanged cap 8, as illustrated in full lines in the drawings. If desired, the casing may have therein an insect destroying agent, but from experience we have found that insects trapped in the casing cannot readily find an outlet therefrom when the spout 5 is closed.

On the top of the casing there are equidistantly spaced right angularly disposed upwardly directed bars 9 which are provided with inwardly directed angle portions 10 at the top thereof. These angle portions are secured to the base of a substantially rectangular frame 11. The frame is constructed of metal, and the elements constituting the same have their confronting edges channeled, as at 12 to receive therein transparent plates 13. The bottom 14 of the housing thus provided is wholly constructed of metal, being in the nature of a flat plate which has any desired number of air inlet openings 15 therethrough. The transparent housing is supported centrally over the casing, and the open top of the housing is closed by a door 16 which is hinged thereto, as at 17. The door is preferably in the nature of a flanged member, the flanges thereof engaging the upper edges of the frame of the housing. The door 16 is provided with an elongated slot 18, and above the slot with a substantially U-shaped hood 19.

Supported on the apertured bottom 14 of the transparent housing there is a lighting agent such as an ordinary kerosene lamp 20. The products of combustion from the lamp find an outlet through the slot 18 and through the hood 19.

The device is designed for use at night when boll weevils, in cotton districts, fly. The boll weevils will be attracted by the light in the transparent housing and will violently contact with the said housing, causing the insects to fall into the upper funnel 3 to be directed therethrough into the casing 1. As previously stated, there may be arranged in the casing an insect destroying agent. When a sufficient number of insects have been trapped and, if desired, destroyed, the valve 7 for the spout 5 or the cap 8 is opened, and when the cap 8 is employed, the same is removed. The insects will thus be directed through the lower funnel and through the spout therefor, and it is thought that the foregoing description, when taken in connection with the drawings will fully set forth the construction, operation and advantages of the improvement.

Having described the invention, we claim:—

In a device for the purpose set forth, a casing having an inwardly directed funnel-shaped member at the top thereof and an outwardly directed funnel-shaped member at the bottom thereof, means controlling the outlet of the last mentioned funnel, legs supporting the casing, right angularly disposed angle members secured to the top of the casing and the horizontal branches of the said members being inwardly directed, a frame having an apertured bottom supported on the said branches at the center of the casing, transparent plates providing the sides and ends of the frame, a slotted top hingedly secured to the frame, a hood on the top over the slot thereof, and the said apertured bottom of the frame designed to support a light medium thereon.

In testimony whereof we affix our signatures.

EDGAR B. LEWIS.
CLARENCE S. CHANDLER.